US009875269B1

(12) United States Patent
Doak (10) Patent No.: US 9,875,269 B1
(45) Date of Patent: Jan. 23, 2018

(54) COLLABORATIVE EDITING IN SELF-CONTAINED SINGLE PAGE APPLICATIONS

(71) Applicant: Sprint Communications Company L.P., Overland Park, KS (US)

(72) Inventor: Jeffrey C. Doak, Rome, NY (US)

(73) Assignee: Sprint Communications Company L.P., Overland Park, KS (US)

( * ) Notice: Subject to any disclaimer, the term of this patent is extended or adjusted under 35 U.S.C. 154(b) by 466 days.

(21) Appl. No.: 14/207,175

(22) Filed: Mar. 12, 2014

(51) Int. Cl.
  *G06F 17/30* (2006.01)
  *G06F 7/00* (2006.01)

(52) U.S. Cl.
  CPC .. *G06F 17/30362* (2013.01); *G06F 17/30008* (2013.01)

(58) Field of Classification Search
  CPC ......... G06F 17/30008; G06F 17/30067; G06F 9/526; G06F 9/52; G06F 9/466
  USPC ........................................................ 707/704
  See application file for complete search history.

(56) References Cited

U.S. PATENT DOCUMENTS

| 9,542,391 | B1* | 1/2017 | Eisner | G06F 17/30011 |
| 2003/0227487 | A1* | 12/2003 | Hugh | G06F 17/30958 715/777 |
| 2006/0155705 | A1* | 7/2006 | Kamper | G06F 17/30067 |
| 2008/0178073 | A1* | 7/2008 | Gao | G06F 17/24 715/243 |
| 2011/0184906 | A1* | 7/2011 | Bailor | G06F 17/24 707/608 |
| 2012/0198319 | A1* | 8/2012 | Agnoli | G06F 9/4843 715/202 |
| 2013/0339847 | A1* | 12/2013 | Bartek | G06Q 10/10 715/255 |
| 2014/0337278 | A1* | 11/2014 | Barton | G06F 17/3023 707/608 |
| 2015/0066524 | A1* | 3/2015 | Fairbrothers | G06F 19/345 705/2 |
| 2017/0041296 | A1* | 2/2017 | Ford | H04L 63/0421 |

* cited by examiner

*Primary Examiner* — Usmaan Saeed
*Assistant Examiner* — Raquel Perez-Arroyo (57) ABSTRACT

A server for editing content using a single page application (SPA). The server comprises a processor, a memory, and a self-contained SPA, that is configured to receive a request from a workstation to edit a selected segment within a file, wherein the file comprises a plurality of segments including the selected segment, determine if the selected segment is locked, wherein locked file segments are unavailable for editing, upon determining that the selected segment is unlocked, provide access to the selected segment to the workstation, lock the selected segment for a period of time, wherein the selected segment is unavailable for editing by any other workstations, receive a save request from the workstation to save changes made to the selected segment, save the changes made in the selected segment within the file, and unlock the selected segment, wherein the unlocked segment is available for editing by any workstation.

17 Claims, 5 Drawing Sheets

COLLABORATIVE EDITING IN SELF-CONTAINED SINGLE PAGE APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiple users within designated groups in an enterprise may be responsible for maintaining and updating data in a dynamic environment, wherein information may often be changing. Users may desire to exchange data, track changes, and consolidate documentation in an approach that is accessible to all members within a group. In order to facilitate documentation, web applications may be employed for data exchange and collaborative editing of information among groups of users. For example, web applications such as wikis may be available as open source tools that may be accessed or downloaded by users. These applications may be implemented as single page applications, wherein the information may be compiled and displayed on a single web page. Single page applications may be self-contained in that the data may be consolidated in one file without entailing external data to view the application properly.

SUMMARY

In an embodiment, a method implemented in a server for editing content using a single page application is disclosed. The method comprises receiving a request from a first workstation to edit a selected segment within a file, wherein the file is composed of a plurality of segments, and wherein the selected segment is one of the plurality of segments, determining if the selected segment is locked, wherein any segments that are locked are unavailable for editing, upon determining that the selected segment is unlocked, providing access to the selected segment to the first workstation, wherein the selected segment is accessed by the single page application, and wherein the single page application is a self-contained application without links to external resources, locking the selected segment for a period of time, wherein the selected segment is unavailable for editing by any other workstations, receiving a save request from the first workstation to save changes made to the selected segment, saving the changes made in the selected segment within the file, and unlocking the selected segment, wherein the unlocked selected segment is available for editing by any workstation.

In an embodiment, a server for editing content using a single page application is disclosed. The server comprises a processor, a memory, and a single page application stored in memory, wherein the single page application is a self-contained application without links to external resources. When executed by the processor, the single page application is configured to receive an edit request from a workstation to edit a selected segment within a file, wherein the file comprises a plurality of segments including the selected segment, and wherein the file is stored in a data store, determine if the selected segment is locked, wherein file segments that are locked are unavailable for editing, upon determining that the selected segment is unlocked, provide access to the selected segment to the workstation, lock the selected segment for a period of time, wherein the selected segment is unavailable for editing by any other workstations, receive a save request from the workstation to save changes made to the selected segment, save the changes made in the selected segment within the file, and unlock the selected segment, wherein the unlocked segment is available for editing by any workstation.

In an embodiment, a method performed in a server for publishing using a single page application is disclosed. The method comprises receiving a publish request from a workstation to publish a new version of a file, wherein the file is assembled from a plurality of segments comprising changes made in one or more segments, creating a backup version of the file comprising the file prior to the changes made in the one or more segments, storing the backup version of the file in a data store accessible to the single page application, wherein the single page application is a self-contained application without links to external resources, publishing the new version of the file comprising the changes made in the one or more segments, storing the new version of the file in the data store accessible to the single page application, accessing a list of email addresses belonging to a plurality of users, wherein the list further comprises email addresses belonging to users who have permission to access the file, sending a notification message to each email address belonging to the plurality of users, wherein the notification message indicates that the new version of the file has been updated and published.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Open source tools or software may allow multiple users to consolidate information in a single resource. In an open source tool such as a wiki, users may create and edit files that provide information on any subject of interest in order to share and update resources among users within a particular group or in an enterprise. Users may utilize a single page application for maintaining information, wherein a single page application is a self-contained application that may be distributed or reused without necessitating any external data for use. In one context, a single page application may refer to an application or a document presented on a single web page on a web browser. In another context, a single page application may describe a single application or document that may be printed and subsequently displayed on a single page. As described herein, a single page application refers to a self-contained application or a self-contained document without links to external resources. As would be appreciated by one skilled in the art, many HTML documents contain links or references to external documents. When such an HTML document is rendered by a browser, the rendering engine of the browser fetches the referenced content from an external source (e.g., external to and not contained within the HTML document itself) at the time that the browser encounters the reference embedded in the HTML document. If the computer on which the browser is executing lacks network connectivity at that moment or if the referenced source lacks network connectivity at that moment, the referenced content cannot be rendered. A single page application may be advantageous in that all the code and/or content associated with the application may be retrieved with a single page load in a web browser without prompting reloading or re-display of the page in order to advance user interaction with the application.

In an embodiment, users may employ a single page application to create, view, and edit the contents of a monolithic file. In an embodiment, the tool allows selecting and viewing the segments of a document before beginning the edit process. The monolithic file may be constructed from multiple segments, wherein users may compose and modify the contents of the segments independently of each other. The single page application may assemble multiple segments to form a monolithic file, wherein the file may be manually distributed among users, for example via an external flash drive. Users may access and edit a file via their local workstations, wherein the file may be stored on a shared server or on a local storage device.

Challenges may arise in a single page application when multiple users in a group or an enterprise desire to modify the contents of a particular segment in a file simultaneously. For example, a first user may access the file and select a particular segment for editing at the same time as a second user. If the first user edits and saves changes to the segment without informing the second user, the second user may also subsequently edit and save changes to the same file segment whilst unknowingly overwriting the modifications of the first user. Since the second user is uninformed of the first user who initially accessed and edited the segment, the subsequent revisions of the second user may be redundant or unnecessary in reference to the first user's modifications. Therefore, there may be a need to overcome these limitations by enhancing functionalities for collaborative editing of information in a single page application, wherein a plurality of users may be notified of updates and prevented from editing the same segment in a file simultaneously, along with additional features.

Disclosed herein are systems and methods for facilitating collaborative editing in self-contained single page applications. A user may employ an editor for a single page application to write, edit, and read segments within a file, wherein a distinct segment may be locked, edited, saved, previewed, and published in a new version of the file. The user may create or select a distinct segment for editing, wherein the distinct segment may be locked for a predetermined period of time. During this period of time, the user may edit the segment accordingly by modifying present content or adding new content. The segment may not be accessed by any other user among a plurality of users during the period of time for which the segment is locked.

After editing, the user may save the changes made to the segment, and the user may choose to preview the segment. The editor may render the code in a preview of the file with the updated segment as it would appear after publication. Following the preview feature, the user may publish a new version of the file with the updated segment, wherein a backup version of the file prior to the changes may also be created. Once the new version has been published, all users within a group or an enterprise who have access to the file may be notified of the updates and provided with a link to access or download the new version of the file. This disclosure teaches improvements for editing content in monolithic files, wherein features of the disclosure may be particularly beneficial for version control and documentation purposes in self-contained single page applications.

Figure 1:
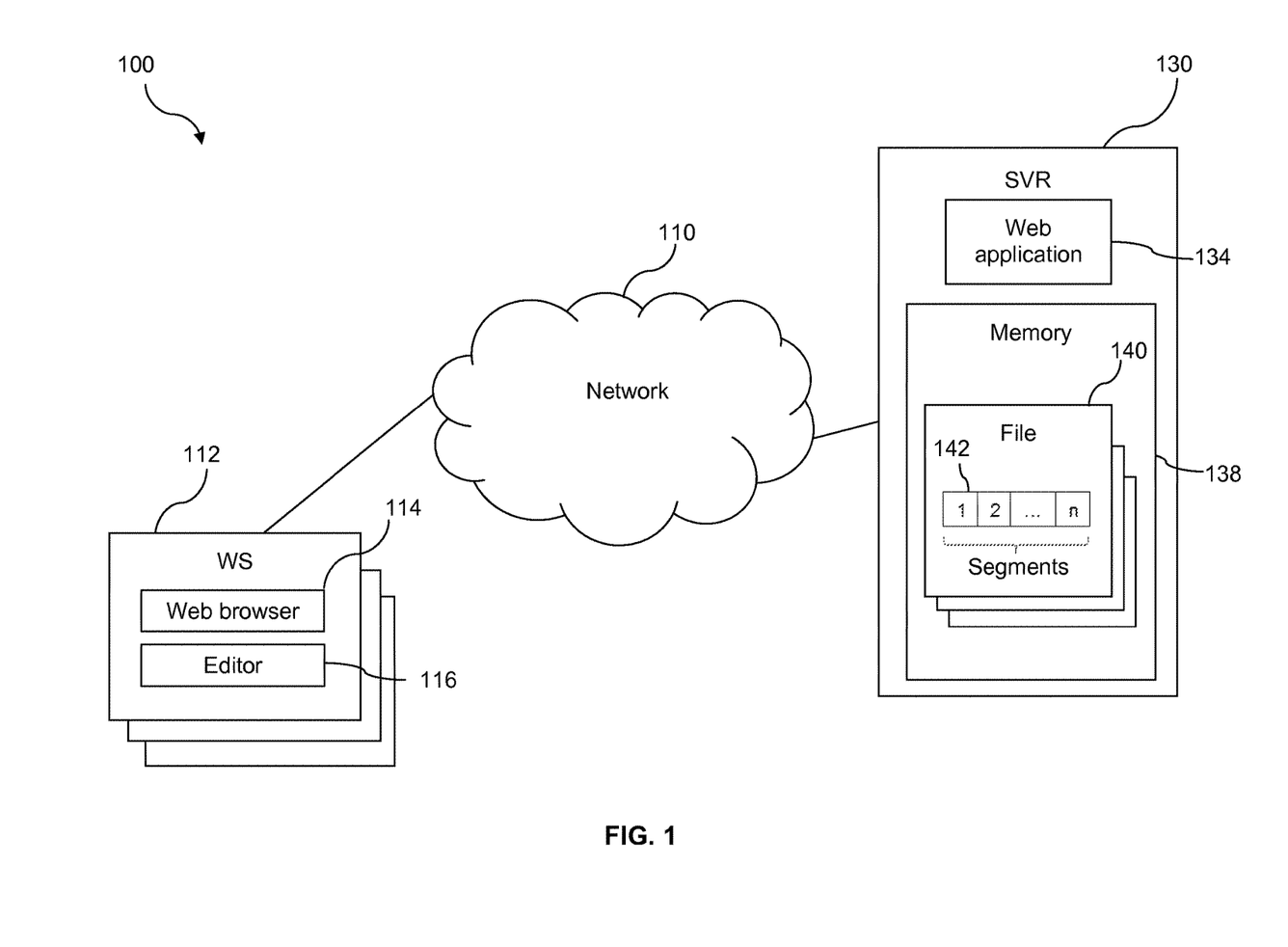
FIG. 1 is an illustration of a system according to an embodiment of the disclosure.

Turning now to FIG. 1, a system 100 is described. The system 100 may comprise a network 110, a plurality of workstations 112, and a server 130. The network 110 may comprise one or more communication networks and may be any combination thereof of private or public communication networks that interconnect components in system 100. It is understood that system 100 may comprise any number of workstations 112. The plurality of workstations 112 may comprise laptops, desktops, tablets, and mobile devices, wherein each workstation 112 may be associated with a user. The plurality of workstations 112 may be at any physical location, wherein each workstation 112 may not need to be located within a single network.

Each workstation 112 may further comprise a web browser application 114 and an editor 116. The web browser 114 may be utilized to retrieve files and access features in one or more web applications as requested by a user. The editor 116 may be used to edit the source code of segments in a file. In an embodiment, the editor 116 may be a specialized HyperText Markup Language (HTML) editor, wherein the source code of the segments may comprise and/or may be composed in the format of HTML, JavaScript, Cascading Style Sheets (CSS), and/or any other programming language.

In system 100, the server 130 may be employed to provide service to the plurality of workstations 112, wherein users may request information, such as access to one or more files. The server 130 may further comprise a web application 134 and a memory 138. The web application 134 may be hosted in server 130 and may generate or access content to send to a workstation 112. Although only one web application 134 is illustrated, there may be more than one web application 134 in system 100. In an embodiment, more than one web application 134 may be employed to provide a variety of features and functionality to the web browser 114 at the workstation 112. In an embodiment, the web application 134 may be referred to as a single page application, wherein the single page application may be accessed by the web browser 114 and displayed on the workstation 112 as a self-contained application on a single web page without links to external resources.

Memory 138 may be a data store which may further comprise a plurality of files 140, wherein the plurality of files 140 may be created and edited by users associated with the plurality of workstations 112. The plurality of files 140 may be monolithic files, wherein each file 140 may be constructed from a plurality of segments 142. There may be n segments 142 in each file 140, wherein n is greater than 1 (n>1). In an embodiment, the plurality of files 140 may be formatted in a HyperText Markup Language (HTML) format, and the segments 142 within each file 140 may comprise metadata and source code in at least one or more of Cascading Style Sheets (CSS) and JavaScript. The segments 142 may be accessed and edited by any user associated with the plurality of workstations 112. It is understood that different files 140 may be constructed from different number of segments.

Although the plurality of files 140 and the corresponding segments 142 are illustrated as being stored in memory 138 of the server 130, this content may alternatively be stored in local or external data stores. In an embodiment, the plurality of files 140 and the corresponding segments 142 may be stored in local data stores in the plurality of workstations 112. In another embodiment, the plurality of files 140 and the corresponding segments 142 may be stored in an external data store that is accessible to users associated with the plurality of workstations 112. For example, the external data store may be a shared network drive or a USB flash drive that is separate from the server 130.

In an embodiment, a user associated with a workstation 112 may submit a request via a web browser 114 that invokes the web application 134 to respond to the request in order to access one or more files 140 and/or segments 142. The web application 134 may search for the one or more files 140 and/or segments 142 in a local or external data store. For example, the web application 134 may search memory 138 for the requested content. After locating the content, the web application 134 may determine whether or not the requested content is locked for editing by other users associated with the plurality of workstations 112. Upon determining that the content is unlocked, the web application 134 may provide access to the first user by sending back the one or more files 140 and/or segments 142 or copies of the requested content to the workstation 112.

Alternatively, the web application 134 may send one or more links to the content to the workstation 112, wherein the user associated with the workstation 112 may access the one or more files 140 and/or segments 142 from an external data store via the one or more links. The user may download the corresponding one or more files 140 and/or segments 142 to a local data store on his or her workstation 112. The one or more files 140 and/or segments 142 may be presented in the web browser 114 and/or modified in the editor 116 by the user at the workstation 112. The requested one or more files 140 and/or segments 142 may subsequently be locked for a period of time and unavailable for editing by any of the other workstations 112 in the network 110.

In an embodiment, the files 140 may be used to document a large number of server computers, for example hundreds of server computers that may host dozens of applications that execute on the servers. Further, the server computers and applications may be configured for use in a number of different environments, for example a test environment, a system integration environment, a pre-production environment, a production environment, and other environments. The documentation may provide information about the configuration of the servers and the applications. The files 140 may be used by information technology workers and/or system administrators responsible for maintaining and servicing the servers. It is understood that under some circumstances the IT workers and/or system administrators will be called upon to quickly resolve problems that are experienced from time to time by the servers and/or applications executing on the servers. The IT workers and/or system administrators may need to resolve the problems as quickly as possible. The files 140 may support quick resolution, as they are self-contained and do not entail a browser rendering content that references links outside of the file 140. In some circumstances the IT worker and/or system administrator may not have access to the Internet and may not be able to access content that is not textually present in the file 140 but is only present as a link or reference to an external source of the subject content. In this work environment, the IT workers and/or system administrators may keep the latest copy of the files 140 on their personal work station 112, for example their personal laptop computer, and can access the whole of the files 140 at any time, regardless of their connectivity to any networks external to their work station 112. It is in this work environment that the files 140 described herein—the single page application—is particularly helpful.

Figure 2:
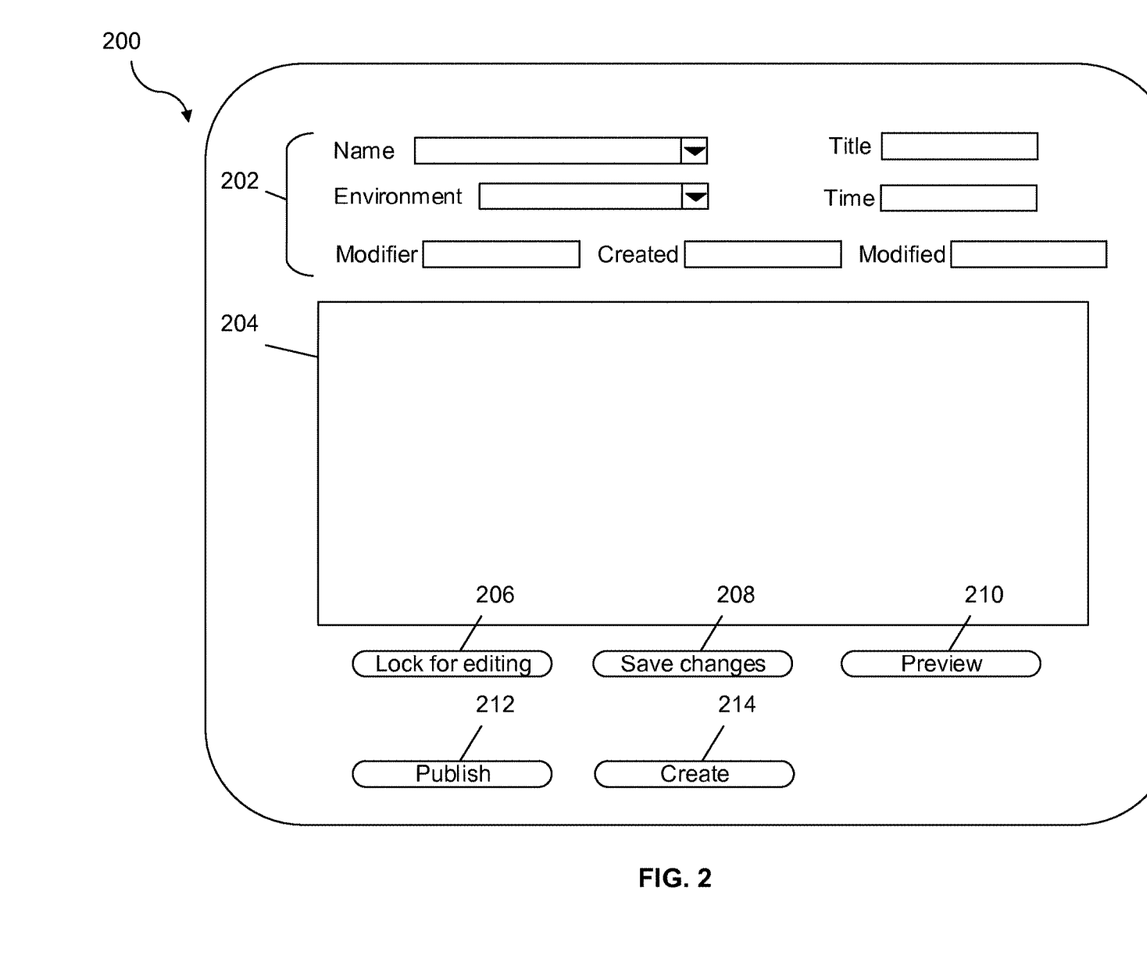
FIG. 2 illustrates a graphical user interface according to an embodiment of the disclosure.

FIG. 2 illustrates a graphical user interface 200 according to an embodiment of the disclosure. The interface 200 may be the graphical user interface of an editor, such as editor 116 in workstation 112, wherein the workstation 112 may have a display or screen for viewing the interface 200. A user associated with the workstation 112 may access the interface 200 for viewing and editing content in one or more segments 142 in one or more files 140. The interface 200 may comprise a settings section 202, a workspace 204, an edit button 206, a save button 208, a preview button 210, a publish button 212, and a create button 214. In an embodiment, the settings section 202 may comprise multiple fields, wherein the user associated with workstation 112 may indicate his or her name, the title of a segment 142, the environment, the time, the modifier, the date the segment 142 was created, and the date the segment 142 was last modified. The interface 200 may be displayed as a web based form, and the content of a segment 142 may be shown in workspace 204, wherein the content may be in an HTML format or any other formatting. If a segment 142 is edited and is checked in as a blank, that segment 142 is deleted from the file 140 by the editor 116.

In an embodiment, programming techniques such as Asynchronous JavaScript and Extensible Markup Language (XML) (AJAX) may be utilized to implement the functionalities of the interface 200, including the control buttons 206-214. The control buttons 206-214 in the interface 200 may assist users in performing various functions in the editor 116. The edit button 206 may allow a user to lock a distinct segment 142 in a file 140 for editing, wherein the distinct segment 142 may be locked for a preset period of time. For example, when the user selects the distinct segment 142 and presses the edit button 206, the web application 134 may lock the selected segment 142 for editing. The locked segment 142 may subsequently be inaccessible to any other user for a preset period of time. In an embodiment, the preset period of time may be about 15 minutes long or any other window of time. For example, the window of time may be about 10 minutes, about 30 minutes, about 60 minutes, about 24 hours, or another period of time. During editing, the save button 208 may allow a user to save changes made to the selected segment 142. In an embodiment, the user may press the save button 208 during the period of time for which the selected segment 142 is locked. That is, the user may press the save button 208 after he or she has pressed the edit button 206 in order to lock the selected segment 142. If the content of the segment 142 is left blank after editing and saving changes, then the segment 142 may automatically be deleted from the file 140.

As an additional feature, the web application 134 may implement an automatic unlock feature associated with the preset period of time for one or more locked segments. If the preset period of time expires before the user has checked in or saved the changes made, the locked segment 142 may automatically unlock and be accessible to other users. This automatic unlock feature may be useful for when the user selects one or more segments 142 for editing and subsequently forgets about the segments 142 which he or she locked. Later on, another user may desire to edit the same segments 142 which the first user had locked and forgotten to check back in. With the automatic unlock feature, the locked segments 142 may be unlocked and available for editing by the second user.

In an embodiment, there may be a timer displayed in the interface 200 for the preset period of time associated with automatic unlock feature. The timer may display the amount of time left during an editing session before the segment 142 automatically unlocks. The period of time associated with the automatic unlock feature may be initiated in a number of ways. In an embodiment, the period of time may be initiated when the user associated with the workstation 112 initially locks the segment 142 for editing. In another embodiment, the period of time may be initiated when the user associated with the workstation 112 is provided with access to the segment 142 for editing. The period of time may also be initiated upon receiving a keystroke from the workstation 112. In another embodiment, the timer associated with the automatic unlock feature may be based on the period of time for which the segment 142 is unedited. For example, the user associated with the workstation 112 may forget to finish editing the segment 142 and may leave the segment 142 locked without remembering to check the segment 142 back in. The timer associated with the automatic unlock feature may assess the period of time for which the segment 142 is unedited or the period of time for which the workstation 112 is inactive. After this period of time expires on the timer, the segment 142 may become unlocked and available for use by any user associated with the plurality of workstations 112.

In an embodiment, the edit button 206 may be used to refresh the timer associated with the automatic unlock feature during editing. For example, the user may actively be working on the locked segment 142, and the timer associated with the automatic unlock feature may be near expiration, e.g., one minute away from expiring and automatically unlocking the segment 142. The user may refresh the timer by clicking on the edit button 206 in the interface 200 in order to restart the timer for another preset period of time. In order to refresh the timer to continue editing content in segment 142, the user may not need to wait until the timer runs out and the segment 142 unlocks. For example, if the timer is set to about 15 minutes, the user may refresh the timer to start another period of about 15 minutes even after working on the locked segment 142 for 14 minutes before.

If the timer associated with the automatic unlock feature has expired, the user who initially locked the segment 142 may still be able to save his or her changes made to the segment 142 by clicking on the save button 208 in the interface 200. In an embodiment, the web application 134 may determine if any changes have been made to the segment 142 by any other user after the original user's lock on segment 142 expired. The web application 134 may check the value of a "changecount" parameter or a similar parameter associated with each segment 142 in file 140. "Changecount" may be an HTML element that is employed to track changes in each segment 142 in file 140. The value of the "changecount" element may be an integer that is incremented each time the segment 142 is modified, wherein the plurality of segments 142 may each have a specific "changecount" value associated with it. If the "changecount" parameter is greater than one, then another user may have made changes to the segment 142 after the original user's lock on the segment 142 expired. In an embodiment, the web application 134 may save the changes made by the original user after the lock's expiration and add these changes to the end of the content in the segment 142. Any user associated with the plurality of workstations may later access the segment 142 and manually merge the changes in content in the segment 142.

In the interface 200, the preview button 210 may allow a user to preview the changes made to the segment 142 within the file 140. The editor 116 may render the code from the workspace 204 in a preview of the file 140 with the modified segment 142 as it would appear after publication. The preview of the file 140 may be displayed in the web browser 114 in order to observe the effects from changes in the segment 142 content. This preview feature may allow the user to ensure that the modified segment 142 in the file 140 will display correctly to other users upon publication. In an embodiment, the preview functionality is handled by the application by combining predefined global sub-sections of the document with the single edited section and creating a single HTML document. The main advantage to this approach is that the selected section may be reviewed before publishing the full document. Once the full document is published, a new version is created and notifications are sent out. This helps avoid multiple rapid releases due to slight content errors. A simple rendering of the HTML of that section may not work because the global formatting and underlying javascript would not be included in the preview.

The publish button 212 may allow a user to publish a new version of the file 140 comprising at least one updated segment 142. For example, a user may make changes to a segment 142 and may publish a new version of the file 140. Prior to publishing the new version, the web application 134 may also create a backup version of the file 140 without the recent changes in the segment 142. After publication, the web application 134 may send a notification message to a plurality of users associated with the plurality of workstations 112, wherein the notification message indicates that the new version of the file 140 has been updated and published by the user. For example, the web application 134 may have access to a list of email addresses associated with the plurality of users to which the notification message may be forwarded. In an embodiment, the list of email addresses and associated users may correspond to a specific group within an enterprise, wherein users in the group have access to the contents of the file 140 and corresponding segments 142.

The create button 214 may allow users to create a new segment 142 in the file 140. For example, the user may select and open an existing segment 142 as a template for a new segment 142, which may be edited and formatted accordingly. The user may modify the title of the segment and other fields in the settings section 202 before saving the content as a new segment 142 with the create button 214.

Each file in the plurality of files 140 may comprise a segment 142 that is set aside as a table of contents for the segments 142 within each file 140. The table of contents may comprise links to all the remaining segments 142 within the file 140. A user may generate the table of contents for each file 140 by making a new segment 142 using the create 214 button. The user may then manually submit entries comprising links to the remaining segments 142 in the table of contents, wherein the order of entries may be arranged in any manner.

Additionally, the web application 134 may be employed to create a new file 140 in the plurality of files 140 stored in memory 138. A user associated with the workstation 112 may be able to create a new segment 142 using the create button 214 in interface 200 and subsequently assign the new segment 142 to a new file 140 by modifying the items in the settings section 202. The settings section 202 may comprise multiple items which may be altered by entering data or by using the drop-down menus to select specific settings.

Figure 3:
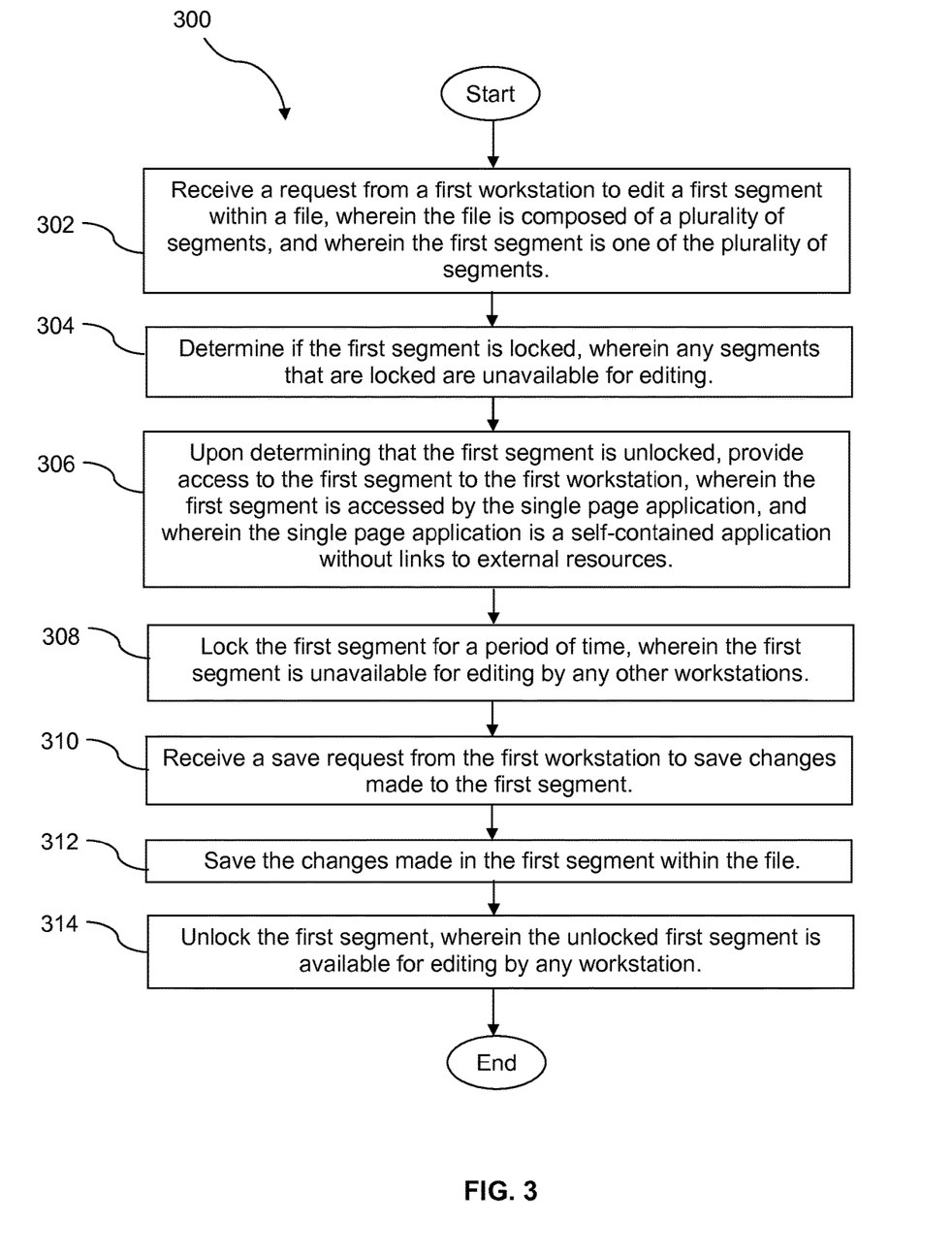
FIG. 3 is a flow chart illustrating a method according to an embodiment of the disclosure.

Referring now to FIG. 3, a method 300 is described. At block 302, a server for editing content using a single page application may receive a request from a first workstation to edit a selected segment within a file, wherein the file is composed of a plurality of segments, and wherein the selected segment is one of the plurality of segments. In an embodiment, the server 130 may receive a request from the workstation 112 to edit one of the segments 142 in the file 140, wherein the file 140 is composed of the plurality of segments 142. At block 304, the server may determine if the selected segment is locked, wherein any segments that are locked are unavailable for editing. In an embodiment, the server 130 may determine if the segment 142 is locked and unavailable for editing. At block 306, upon determining that the selected segment is unlocked, the server may provide access to the selected segment to the first workstation, wherein the selected segment is accessed by the single page application, and wherein the single page application is a self-contained application without links to external resources. In an embodiment, the server 130 may provide access to the segment 142 to the workstation 112, wherein the segment 142 may be accessed by the web application 134. The web application 134 may be a single page application that is a self-contained application that does not necessitate any external data or links to external resources. At block 308, the server may lock the selected segment for a period of time, wherein the selected segment is unavailable for editing by any other workstations. In an embodiment, the server 130 may lock segment 142 for a period of time, wherein the other workstations 112 may not access the segment 142. At block 310, the server may receive a save request from the first workstation to save changes made to the selected segment. In an embodiment, the server 130 may receive a save request from the workstation 112 to save changes made to the segment 142. At block 312, the server may save the changes made in the selected segment within the file. In an embodiment, the server 130 may save the changes made in the segment 142 within the file 140. At block 314, the server may unlock the selected segment, wherein the unlocked selected segment is available for editing by any workstation. In an embodiment, the server 130 may unlock the segment 142, wherein the unlocked segment 142 may be available for editing by any workstation 112.

Figure 4:
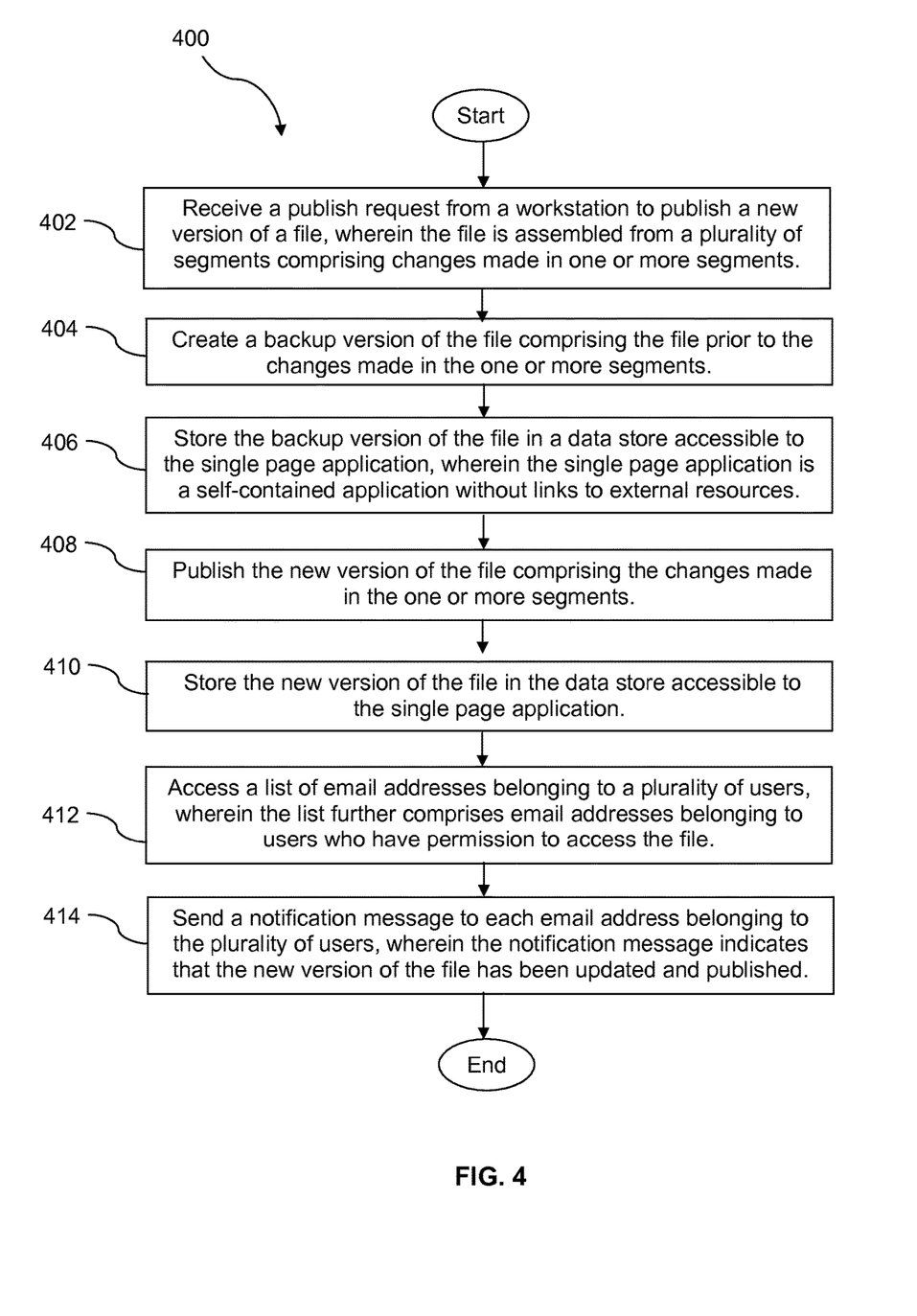
FIG. 4 is a flow chart illustrating another method according to an embodiment of the disclosure.

FIG. 4 is a flowchart of a method 400. In FIG. 4, an embodiment in which the server 130 publishes the updated one or more segments 142 in the file 140 is shown. At block 402, the server may receive a publish request from a workstation to publish a new version of a file, wherein the file is assembled from a plurality of segments comprising changes made in one or more segments. In an embodiment, the server 130 may receive a publish request from a workstation 112 to publish a new version of the file 140, wherein the file 140 is assembled from the plurality of segments 142 comprising changes made in one or more segments 142. At block 404, the server may create a backup version of the file comprising the file prior to the changes made in the one or more segments. In an embodiment, the server 130 may create a backup version of the file 140 comprising the file 140 prior to the changes made in the one or more segments 142. At block 406, the server may store the backup version of the file in a data store accessible to the single page application, wherein the single page application is a self-contained application without links to external resources. In an embodiment, the server 130 may store the backup version of the file 140 in a data store such as memory 138. Memory 138 may be accessible to the web application 134, wherein the web application 134 may be a single page application that is a self-contained application that does not necessitate any external data or links to external resources. At block 408, the server may publish the new version of the file comprising the changes made in the one or more segments. In an embodiment, the server 130 may publish the new version of the file 140 comprising the changes made in the one or more segments 142. At block 410, the server may store the new version of the file in the data store accessible to the single page application. In an embodiment, the server 130 may store the new version of the file 140 in memory 138, wherein memory 138 may be accessible to the web application 134. At block 412, the server may access a list of email addresses belonging to a plurality of users, wherein the list further comprises email addresses belonging to users who have permission to access the file. In an embodiment, the server 130 may access a list of email addresses belonging to users who have permission to access the file 140. At block 414, the server may send a notification message to each email address belonging to the plurality of users, wherein the notification message indicates that the new version of the file has been updated and published. In an embodiment, the server 130 may send a notification message to each email address belonging to the plurality of users, and the notification message may indicate that the new version of the file 140 has been updated and published.

Figure 5:
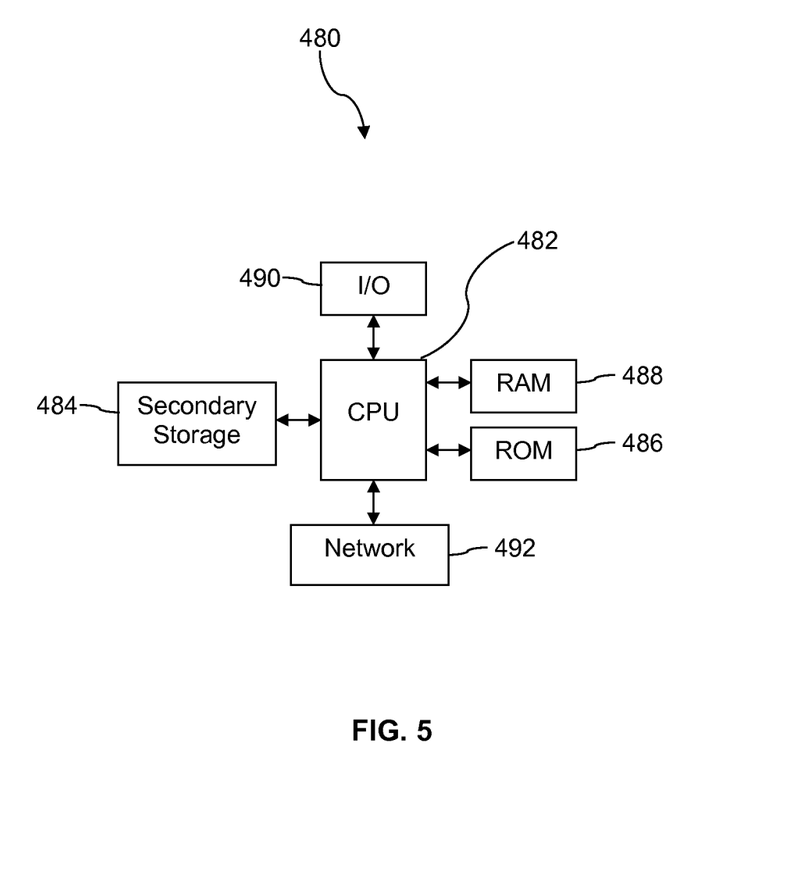
FIG. 5 illustrates an exemplary computer system suitable for implementing some aspects of the several embodiments of the disclosure.

FIG. 5 illustrates an embodiment of a computer system or server 480, which may be suitable for implementing one or more embodiments of the components disclosed herein, such as the server 130. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus, such as a server 130 comprising a web application 134 and a memory 138, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a server for editing content using a single page application, comprising:
   receiving a request from a workstation to edit a selected segment of a plurality of segments within a file, wherein the file is in a markup language format, and wherein the plurality of segments within the file comprises source code in at least one of Cascading Style Sheets or JavaScript;
   determining if the selected segment is locked, wherein any segments that are locked are unavailable for editing;
   upon determining that the selected segment is unlocked, providing access to the selected segment to the workstation, wherein the selected segment is accessed by the single page application, and wherein the single page application is a self-contained application without links to external resources;
   locking the selected segment for a period of time, wherein the selected segment is unavailable for editing by any other workstations;
   receiving a save request from the workstation to save changes made to the selected segment;
   saving the changes made in the selected segment within the file;
   receiving a preview request from the workstation to preview the changes made to the selected segment within the file prior to publishing;
   responsive to receiving the preview request and prior to publishing a new version of the file comprising the selected segment, sending predefined global sub-sections of the file and the selected segment to the workstation for previewing, wherein the previewing comprises combining the predefined global sub-sections and the source code in the selected segment to create a single markup language document that is rendered and displayed by a web browser in the workstation as the selected segment is to appear after publication;
   subsequent to the previewing, publishing the new version of the file comprising the selected segment, wherein the new version of the file is in the markup language format and is self-contained without links to external resources outside of the new version of the file;
   responsive to the publishing, sending, to a plurality of users with access to the file, a notification message indicating that the file has been updated and the new version of the file has been published; and
   unlocking the selected segment, wherein the unlocked selected segment is available for editing by any workstation.

2. The method of claim 1, wherein the file is stored in a data store accessible by the single page application in the server.

3. The method of claim 1, further comprising:
   upon determining that the selected segment is locked, sending a message to the workstation, wherein the message indicates that the selected segment is locked and unavailable for editing.

4. The method of claim 1, wherein providing access to the selected segment to the workstation further comprises sending content of the selected segment, a copy of the selected segment, or a link to the selected segment to the workstation.

5. The method of claim 4, wherein the content sent to the workstation is displayed via the web browser at the workstation and edited via an editor at the workstation.

6. The method of claim 1, further comprising:
   upon expiration of the period of time, unlocking the selected segment;
   receiving a lock request from the workstation to lock the selected segment for an additional period of time; and
   locking the selected segment as requested, wherein the selected segment is unavailable for editing by any other workstation.

7. The method of claim 1, further comprising:
   receiving a create request from the workstation to create a new segment in the file;

creating the new segment in the file; and
storing the new segment in the file in a data store.

8. The method of claim 1, wherein the period of time is initiated upon receiving a keystroke from the workstation.

9. A server for editing content using a single page application, comprising:
a processor;
a memory; and
a single page application stored in the memory, wherein the single page application is a self-contained application without links to external resources, that when executed by the processor, is configured to:
receive an edit request from a workstation to edit a selected segment of a plurality of segments within a file, wherein the file is in a markup language format, and wherein the plurality of segments within the file comprises source code in at least one of Cascading Style Sheets or JavaScript;
determine if the selected segment is locked, wherein file segments that are locked are unavailable for editing;
upon determining that the selected segment is unlocked, provide access to the selected segment to the workstation;
lock the selected segment for a period of time, wherein the selected segment is unavailable for editing by any other workstations;
receive a save request from the workstation to save changes made to the selected segment;
save the changes made in the selected segment within the file;
receive a preview request from the workstation to preview the changes made to the selected segment within the file prior to publishing;
responsive to receiving the preview request and prior to publishing a new version of the file comprising the selected segment, send predefined global sub-sections of the file and the selected segment to the workstation for previewing, wherein the previewing comprises combining the predefined global sub-sections and the source code in the selected segment to create a single markup language document that is rendered and displayed by a web browser in the workstation as the selected segment is to appear after publication;
subsequent to the previewing, publish the new version of the file comprising the selected segment, wherein the new version of the file is in the markup language format and is self-contained without links to external resources outside of the new version of the file;
responsive to the publishing, send, to a plurality of users with access to the file, a notification message indicating that the file has been updated and the new version of the file has been published; and
unlock the selected segment, wherein the unlocked segment is available for editing by any workstation.

10. The server of claim 9, wherein the single page application further comprises an application in a collaborative environment that allows users associated with other workstations to create, edit, and view the file.

11. The server of claim 9, wherein the markup language format is a HyperText Markup Language (HTML) format.

12. The server of claim 9, wherein the workstation is one of a laptop, a desktop, a tablet, or a mobile device.

13. The server of claim 9, wherein the file is stored in a data store, and wherein the data store is located in the memory of the server.

14. The server of claim 9, wherein the period of time is initiated upon providing access to the selected segment to the workstation.

15. The method of claim 1, wherein the notification message comprises a link to download or access the new version of the file in a data store.

16. The method of claim 15, wherein the notification message further indicates and describes the changes made in the selected segment in the new version of the file.

17. The method of claim 1, wherein the single markup language document is a HyperText Markup Language (HTML) document.

* * * * *